(12) United States Patent
Liu

(10) Patent No.: US 11,947,406 B2
(45) Date of Patent: Apr. 2, 2024

(54) METHOD, ELECTRONIC DEVICE, AND COMPUTER PROGRAM PRODUCT FOR MEMORY FAULT PREDICTION

(71) Applicant: DELL PRODUCTS L.P., Round Rock, TX (US)

(72) Inventor: Bing Liu, Tianjin (CN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 17/678,837

(22) Filed: Feb. 23, 2022

(65) Prior Publication Data

US 2023/0222024 A1 Jul. 13, 2023

(30) Foreign Application Priority Data

Jan. 12, 2022 (CN) .......................... 202210030438.9

(51) Int. Cl.
*G06F 11/00* (2006.01)
*G06F 11/07* (2006.01)

(52) U.S. Cl.
CPC .......... *G06F 11/008* (2013.01); *G06F 11/073* (2013.01); *G06F 11/079* (2013.01)

(58) Field of Classification Search
CPC .... G06F 11/008; G06F 11/073; G06F 11/079; G06F 11/0793
See application file for complete search history.

(56) References Cited

U.S. PATENT DOCUMENTS

| 10,430,271 | B1 * | 10/2019 | Filatov | ............... G06F 11/0754 |
| 11,190,425 | B2 * | 11/2021 | Padfield | .............. H04L 43/0823 |
| 2015/0074469 | A1 * | 3/2015 | Cher | ..................... G06F 11/008 |
| | | | | 714/47.2 |

* cited by examiner

*Primary Examiner* — Joseph R Kudirka
(74) *Attorney, Agent, or Firm* — WOMBLE BOND DICKINSON (US) LLP

(57) ABSTRACT

Embodiments of the present disclosure relate to a method, an electronic device, and a computer program product for memory fault prediction. In a method for memory fault prediction provided by the embodiments of the present disclosure, an accuracy of fault prediction over a past period of time is obtained, each fault prediction is made based on a comparison of a prediction confidence with a confidence threshold, and the accuracy indicates an amount of work to reconstruct and diagnose predicted faulty memories after the fault prediction; the confidence threshold is adjusted in response to the accuracy being less than an accuracy threshold; a detection rate of the fault prediction over the past period of time is obtained; and the confidence threshold is adjusted reversely in response to the detection rate being less than a detection rate threshold. In this way, the reliability of memories in nodes is guaranteed while reducing unnecessary reconstructions and diagnoses.

20 Claims, 4 Drawing Sheets

METHOD, ELECTRONIC DEVICE, AND COMPUTER PROGRAM PRODUCT FOR MEMORY FAULT PREDICTION

CROSS-REFERENCE TO RELATED APPLICATION

This patent application claims priority, under 35 U.S.C. § 119, of Chinese Patent Application No. 202210030438.9, filed Jan. 12, 2022, which is incorporated by reference in its entirety.

TECHNICAL FIELD

Embodiments of the present disclosure relate to the field of data storage, and more particularly, to a method, an electronic device, and a computer program product for memory fault prediction.

BACKGROUND

With the continuous development of computer technologies, people rely more and more on server-side storage capacity. Once any memory in a server fails, data loss or service interruption may be caused, resulting in a huge impact on users. There is a known memory fault prediction manner based on machine learning, which is implemented on one node of a cluster computing system. The node is responsible for collecting storage health information of other nodes. The node performs fault prediction for memories of other nodes based on the collected information, and returns prediction results to respective nodes.

SUMMARY OF THE INVENTION

In a first aspect of the present disclosure, a method for memory fault prediction is provided. The method includes obtaining an accuracy of fault predictions over a past period of time, each fault prediction is made based on a comparison of a prediction confidence with a confidence threshold, and the accuracy indicates an amount of work to reconstruct and diagnose predicted faulty memories after the fault prediction. The method further includes adjusting the confidence threshold in response to the accuracy being less than an accuracy threshold. The method further includes obtaining a detection rate of the fault prediction over the past period of time. The method further includes adjusting the confidence threshold reversely in response to the detection rate being less than a detection rate threshold.

In a second aspect of the present disclosure, an electronic device is provided. The electronic device includes a processor and a memory coupled to the processor, and the memory has instructions stored therein which, when executed by the processor, cause the device to perform actions. The actions include obtaining an accuracy of fault prediction over a past period of time, each fault prediction is made based on a comparison of a prediction confidence with a confidence threshold, and the accuracy indicates an amount of work to reconstruct and diagnose predicted faulty memories after the fault prediction. The actions further include adjusting the confidence threshold in response to the accuracy being less than an accuracy threshold. The actions further include obtaining a detection rate of the fault prediction over the past period of time. The actions further include adjusting the confidence threshold reversely in response to the detection rate being less than a detection rate threshold.

In a third aspect of the present disclosure, a computer program product is provided. The computer program product is tangibly stored on a computer-readable medium and includes machine-executable instructions. The machine-executable instructions, when executed, cause a machine to perform the method according to the first aspect.

The Summary of the Invention part is provided to introduce the selection of concepts in a simplified form, which will be further described in the Detailed Description below. The Summary of the Invention part is neither intended to identify key features or main features of the present disclosure, nor intended to limit the scope of the present disclosure.

BRIEF DESCRIPTION OF THE DRAWINGS

By more detailed description of example embodiments of the present disclosure with reference to the accompanying drawings, the above and other objectives, features, and advantages of the present disclosure will become more apparent, where identical reference numerals generally represent identical components in the example embodiments of the present disclosure. In the accompanying drawings.

DETAILED DESCRIPTION

Figure 1:
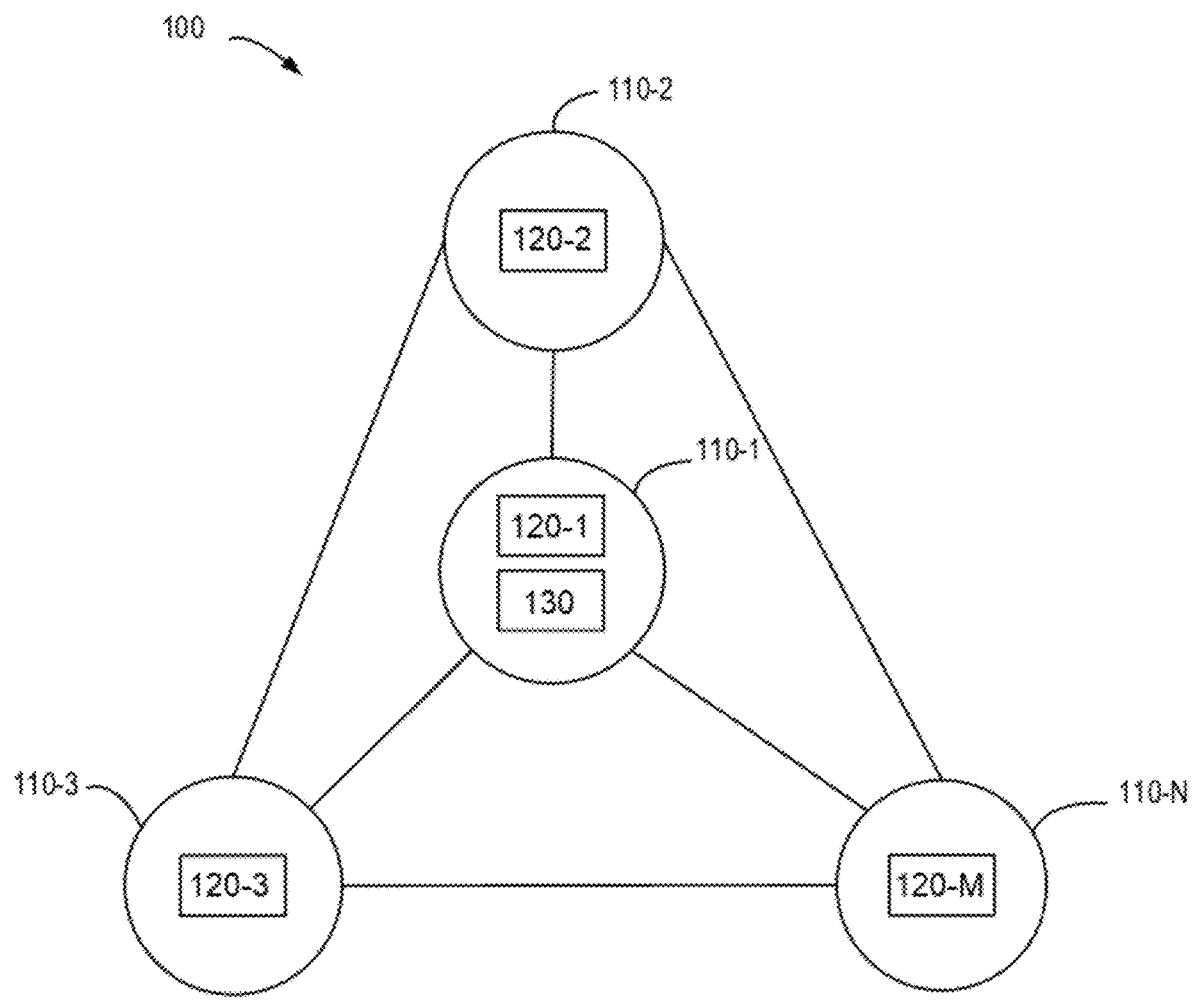
FIG. 1 shows a schematic diagram of an example environment in which embodiments of the present disclosure may be implemented.

The principles of the present disclosure will be described below with reference to several example embodiments illustrated in the accompanying drawings. Although the drawings show preferred embodiments of the present disclosure, it should be understood that these embodiments are merely described to enable those skilled in the art to better understand and then implement the present disclosure, and not to limit the scope of the present disclosure in any way.

The term "include" used herein and variants thereof indicate open-ended inclusion, that is, "including but not limited to." Unless otherwise stated, the term "or" means "and/or." The term "based on" denotes "at least partially based on." The terms "an example embodiment" and "an embodiment" denote "at least one example embodiment." The term "another embodiment" means "at least one further embodiment." The terms "first," "second," and the like may refer to different or the same objects. Other explicit and implicit definitions may also be included below.

Typically, a Self-Monitoring Analysis and Reporting Technology (SMART) is provided in a memory of each node in a cluster to detect and report various storage reliability indicators. A node in the cluster is responsible for collecting SMART data of all nodes in the cluster for performing fault prediction on the memories of these nodes.

In addition, in order to verify whether a predicted suspicious memory is actually faulty, the predicted suspicious memory needs to be diagnosed by a read-write test. In practice, if a suspicious memory is first diagnosed and then reconstructed, then only the "read" test can be performed, but not the "write" test. This is because the write operation will disturb data on the suspicious memory. Therefore, after a suspicious faulty memory is predicted, reconstruction needs to be performed first to migrate data out of the suspicious memory. Then, diagnosis is performed.

The higher the accuracy of fault prediction is, the smaller the number of needed reconstructions and diagnoses is. Generally, the fault prediction is based on a comparison of a predicted value with a preset threshold. The preset threshold is fixed. However, over time or maintenance of memories, faulty memories may increase or decrease. Therefore, if fault prediction is performed on memories based on a fixed threshold, both the prediction accuracy and the detection rate will be affected.

Embodiments of the present disclosure provide a solution for memory fault prediction so that a confidence threshold of fault prediction varies with a predetermined accuracy threshold and a predetermined detection rate threshold. Thus, memory fault prediction based on an adaptive confidence threshold is achieved.

According to various embodiments of the present disclosure, an accuracy of fault prediction for memories over a past period of time is obtained. The accuracy indicates an amount of work to reconstruct and diagnose predicted faulty memories after the fault prediction. A confidence threshold for predicting faults is adjusted in response to the accuracy being less than an accuracy threshold. In addition, a detection rate of the fault prediction over a past period of time is also obtained. The confidence threshold is adjusted reversely in response to the detection rate being less than a detection rate threshold.

According to the embodiments described herein, the accuracy of the fault prediction can reach an accuracy expected by users by adjusting the confidence threshold. Thus, unnecessary reconstructions and diagnoses can be reduced. Therefore, system resources are saved and computational costs are reduced. In addition, by adjusting the confidence threshold reversely, the detection rate of fault prediction can also reach a threshold expected by users, thus ensuring the reliability of memories in nodes.

The basic principles and some example implementations of the present disclosure will be described below with reference to the accompanying drawings. It should be understood that these example embodiments are given only to enable those skilled in the art to better understand and then implement the embodiments of the present disclosure, and are not intended to limit the scope of the present disclosure in any way.

FIG. 1 shows a schematic diagram of an example environment in which an embodiment of the present disclosure may be implemented. As shown in FIG. 1, environment 100 is a cluster computing environment including node 110-1, node 110-2, node 110-3, and node 110-N (also collectively or individually referred to as "node 110") communicatively coupled to each other, where N is a natural number. Node 110 may be a server that provides storage services for users.

Node 110-1 includes memory 120-1, node 110-2 includes memory 120-2, node 110-3 includes memory 120-3, and node 110-N includes memory 120-M. Memory 120-1, memory 120-2, memory 120-3, and memory 120-M may also be collectively or individually referred to as "memory 120," where M is a natural number. Memory 120 may be a hard disk drive, a removable disk drive, or other types of disk drives. In addition, memory 120 may be a single disk or a Redundant Array of Independent Disks (RAID) that combines multiple disks together.

Each memory 120 is provided with a SMART to detect and report various memory reliability indicators. Each node 110 may include or be provided with a fault predictor. The fault predictor may perform memory fault prediction using SMART data. Therefore, any of nodes 110 may act as a proxy node in the cluster for collecting SMART data from memory 120 in each node 110 and performing fault prediction for each memory 120. In FIG. 1, only fault predictor 130 located in node 110-1 is shown. Node 110-1 acts as a proxy node in environment 100.

For example, fault predictor 130 may perform fault prediction for memory 120-2 based on the SMART data collected by node 110-1 from node 110-2. The output of fault predictor 130 is a prediction confidence. The range of the prediction confidence is [0, 1]. The prediction confidence needs to be compared with a confidence threshold to determine whether memory 120-2 is predicted to be faulty. If memory 120-2 is predicted to be faulty, it needs to be reconstructed. Then, known fault diagnosis techniques can be used to diagnose whether memory 120-2 is actually faulty.

It should be understood that other fault prediction tools may be used for fault prediction of a memory in addition to the fault predictor that uses SMART data for prediction. The scope of the present disclosure is not limited in this respect as long as the prediction tool used outputs a prediction result in the form of a confidence. In addition, the value of the prediction result (i.e., prediction confidence) may also be expressed as a percentage value, such as [0%, 100%].

In addition, it should be understood that the structure and functions of environment 100 are described for illustrative purposes only and do not imply any limitation to the scope of the present disclosure. For example, the embodiments of the present disclosure may also be applied to an environment different from environment 100. In addition, although only 4 nodes are shown in FIG. 1, the number of nodes is not limited thereto, and there may be more or fewer nodes. Although FIG. 1 only shows that each node includes one memory, it is not limited to this, and each node may also include more memories.

Figure 2:
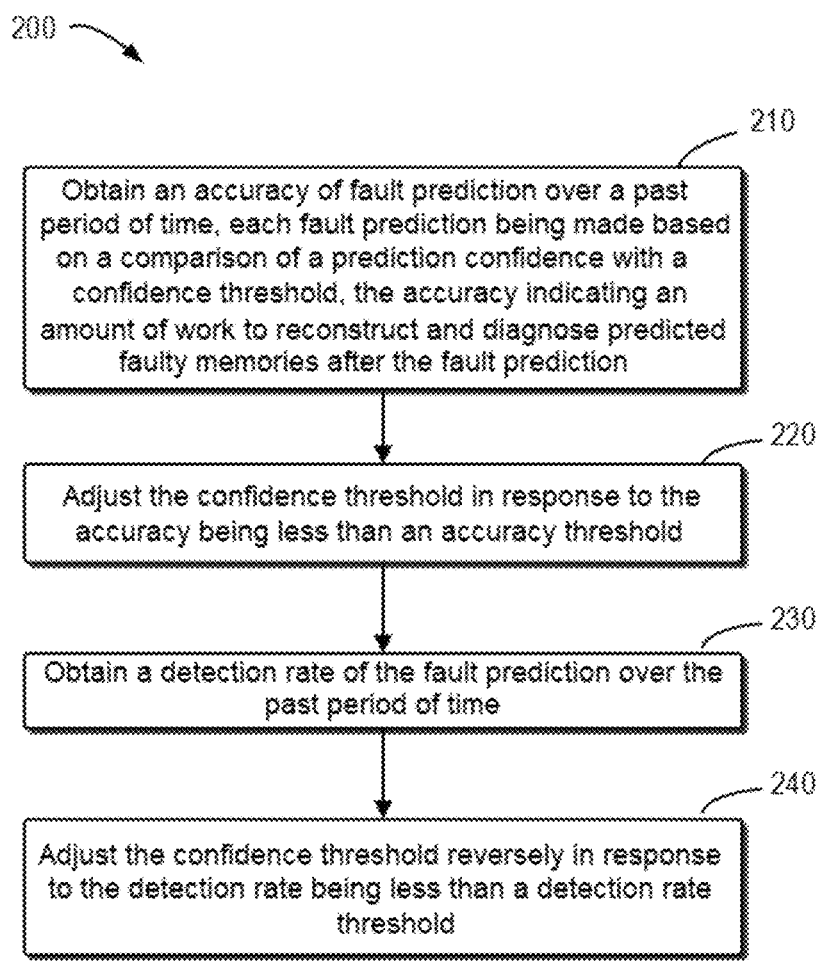
FIG. 2 shows a flow chart of an example method for memory fault prediction according to an embodiment of the present disclosure.

FIG. 2 shows a flow chart of example method 200 for memory fault prediction according to an embodiment of the present disclosure. Method 200 may be performed, for example, in a proxy node (e.g., node 110-1) in a clustered computing environment (e.g., environment 100 shown in FIG. 1). It should be understood that method 200 may also include additional actions not shown and/or may omit actions shown, and the scope of the present disclosure is not limited in this regard. Method 200 will be described in detail below in combination with FIG. 1.

At block 210, node 110-1 obtains an accuracy of fault prediction over a past period of time. For example, node 110-1 may obtain an accuracy of fault prediction performed by fault predictor 130 for multiple memories 120 over the past week. The period of time may also be any suitable period of time, such as one day, several days, several weeks, one month, or several months, and the scope of the present disclosure is not limited in this respect. As previously described, each fault prediction by fault predictor 130 for multiple memories 120 is based on a comparison of a prediction confidence with a confidence threshold. If fault predictor 130 is configured to predict memory 120 to be faulty in response to the prediction confidence exceeding the confidence threshold, then a relationship of the accuracy versus the confidence threshold may be as shown in FIG. 3.

Figure 3:
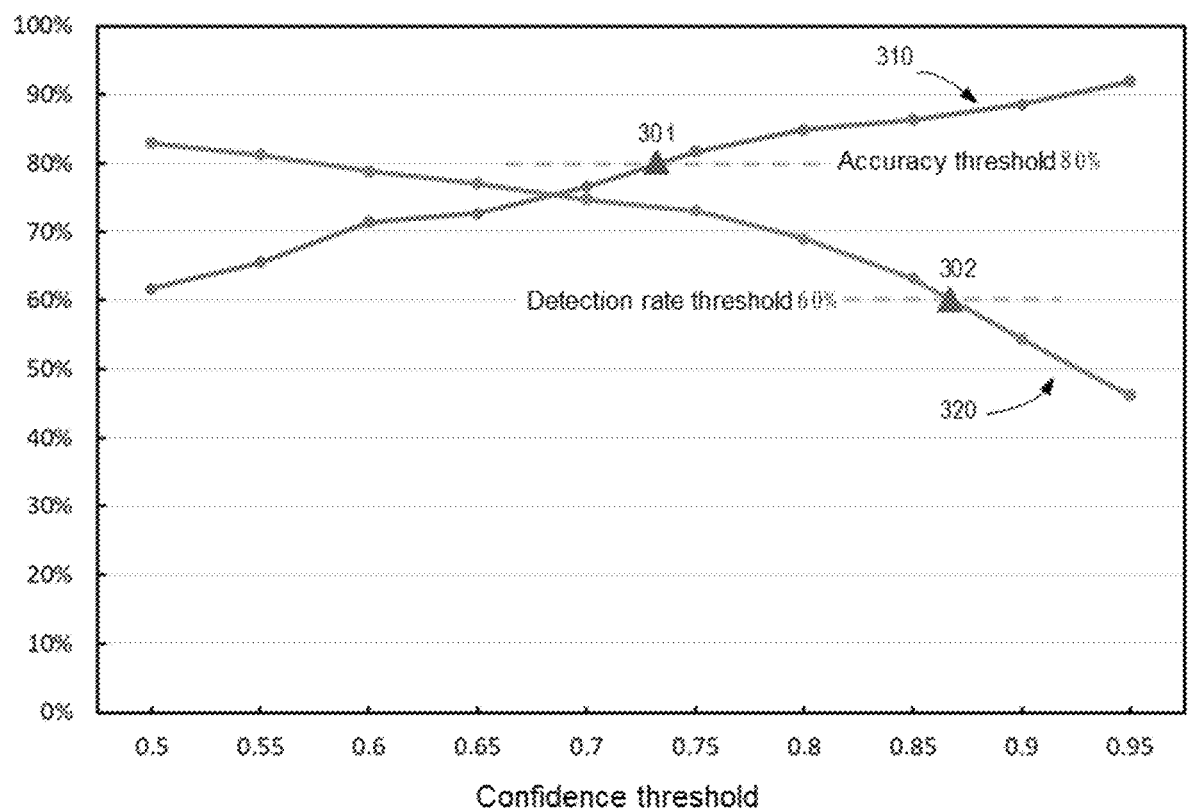
FIG. 3 is a schematic diagram illustrating a relation curve of accuracy versus confidence threshold and a relation curve of detection rate versus confidence threshold according to some embodiments of the present disclosure.

FIG. 3 is a schematic diagram illustrating relation curve 310 of accuracy versus confidence threshold and relation curve 320 of detection rate versus confidence threshold according to some embodiments of the present disclosure. The horizontal axis of FIG. 3 represents a confidence threshold, and the vertical axis represents an accuracy rate value and a detection rate value as percentage values.

In FIG. 3, the accuracy rate increases as the confidence threshold increases, and the detection rate decreases as the confidence threshold increases. It should be understood that if fault predictor 130 is configured to predict memory 120 to be faulty in response to the prediction confidence not exceeding the confidence threshold, then the accuracy will decrease as the confidence threshold increases and the detection rate will increase as the confidence threshold increases.

Since memory 120 predicted to be faulty needs to be reconstructed and diagnosed to determine if memory 120 is actually faulty, the accuracy indicates an amount of work to reconstruct and diagnose predicted faulty memories after the fault prediction. In the embodiment shown in FIG. 3, as the confidence threshold is higher, the accuracy is higher, the detection rate is lower, and the amount of work to reconstruct and diagnose after the fault prediction is smaller.

In the embodiments of the present disclosure, a user may set and/or adjust the accuracy threshold and the detection rate threshold as needed. In response to the accuracy being less than the accuracy threshold over a past period of time (e.g., one week), the confidence threshold may be adjusted, as shown in block 220 of FIG. 2.

For example, assuming that the current confidence threshold is 0.7, then the accuracy of fault predictor 130 over the past week is 76%. In the embodiment shown in FIG. 3, the accuracy threshold is set to 80%, which is greater than the accuracy in the past week. Therefore, the confidence threshold needs to be raised. An accuracy threshold of 80% corresponds to point 301 on curve 310. The horizontal axis (i.e., confidence threshold) corresponding to point 301 is approximately 0.74. Therefore, it is only necessary to adjust the confidence threshold to be greater than or equal to 0.74.

Returning to FIG. 2, at block 230, a detection rate of the fault prediction over a past period of time (e.g., over a week) may also be obtained. Then, at block 240, the confidence threshold is adjusted reversely in response to the detection rate being less than a detection rate threshold.

For example, it is assumed that the confidence threshold is adjusted to 0.9 at block 220, then the detection rate over the past week is 55%. In the embodiment shown in FIG. 3, the detection rate threshold is set to 60%, which is greater than the detection rate over the past week. Therefore, the confidence threshold needs to be lowered. A detection rate threshold of 60% corresponds to point 302 on curve 320. The horizontal axis (i.e., confidence threshold) corresponding to point 302 is approximately 0.87. Therefore, in the embodiment shown in FIG. 3, it is only necessary to adjust the confidence threshold to any value greater than or equal to 0.74 and less than or equal to 0.87.

It should be understood that the values of the accuracy threshold and the detection rate threshold are merely illustrative and are not intended to limit the scope of the present disclosure. In some other embodiments, other suitable values may be used as the accuracy threshold and the detection rate threshold. Similarly, the values of the accuracy and the detection rate described above are merely illustrative and are not intended to limit the scope of the present disclosure. In some other embodiments, the accuracy and the detection rate obtained may be other suitable values.

Likewise, the value of the confidence threshold described above is merely illustrative and is not intended to limit the scope of the present disclosure. The confidence threshold of the present disclosure may have a value range of (0, 1). In some embodiments, a default value of the confidence threshold may be set to 0.5, and the value range is within (0.5, 1).

In the event that fault predictor 130 is configured to predict memory 120 to be faulty in response to the prediction confidence not exceeding the confidence threshold, the confidence threshold may be lowered in response to the accuracy being less than the accuracy threshold. Also, the confidence threshold may be raised in response to the detection rate being less than the detection rate threshold.

In this way, even if faulty memories increase or decrease over time or maintenance of memories, it is possible to ensure that the accuracy and/or detection rate reaches users' expectation because the confidence threshold can be adaptively adjusted as the accuracy threshold and/or detection rate threshold change. Thus, unnecessary reconstructions and diagnoses can be reduced. Therefore, system resources are saved and computational costs are reduced. Meanwhile, the reliability of memories is guaranteed.

In some embodiments, the obtaining the detection rate may include: obtaining a first number of faulty memories determined by diagnosis over a past period of time (e.g., one week); obtaining a second number of faulty memories reported by processes other than the fault prediction over a past period of time (e.g., one week); and calculating the detection rate by dividing the first number by a sum of the first number and the second number.

The detection rate indicates what percentage of all fault memories is predicted. However, the total number of faulty memories is difficult to know. Therefore, a first number of memories determined to be faulty over a past period of time and a second number of memory faults (e.g., input/output (IO) errors) discovered by other programs or processes over that period of time may be summed as the total number of faulty memories. The ratio of the first number to the total number is the detection rate.

Figure 4:
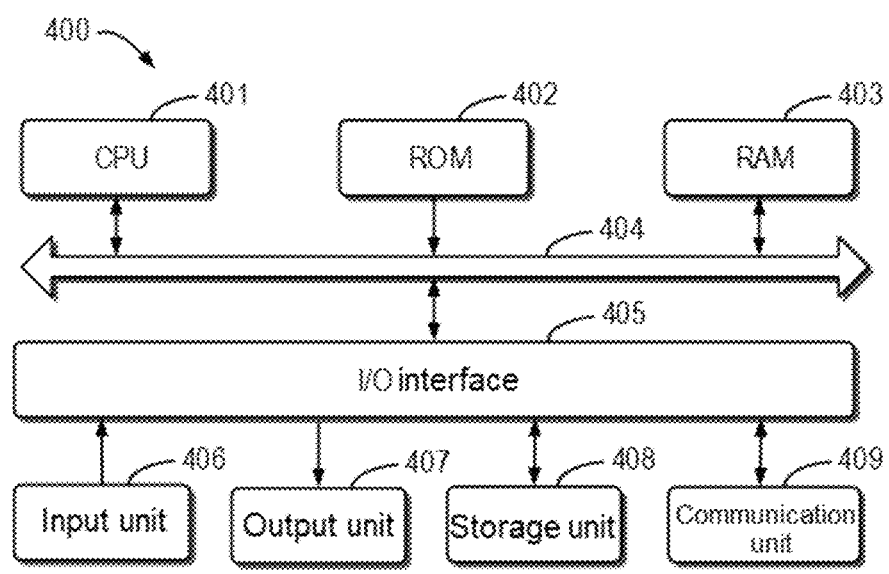
FIG. 4 shows a block diagram of an example device that may be configured to implement embodiments of the present disclosure.

FIG. 4 shows a schematic block diagram of example device 400 that may be configured to implement embodiments of the present disclosure. For example, cloud server 110 shown in FIG. 1 may be implemented by device 400. As shown in FIG. 4, device 400 includes central processing unit (CPU) 401 which may perform various appropriate actions and processing according to computer program instructions stored in read-only memory (ROM) 402 or computer program instructions loaded from storage unit 408 to random access memory (RAM) 403. Various programs and data required by operations of device 400 may also be stored in RAM 403. CPU 401, ROM 402, and RAM 403 are connected to each other through bus 404. Input/output (I/O) interface 405 is also connected to bus 404.

A number of components in device 400 are connected to I/O interface 405, including: an input unit 406, such as a keyboard and a mouse; an output unit 407, such as various types of displays and speakers; a storage unit 408, such as a magnetic disk and an optical disc; and communication unit 409, such as a network card, a modem, or a wireless communication transceiver. Communication unit 409 allows device 400 to exchange information/data with other devices through a computer network such as the Internet and/or various telecommunication networks.

The various processes and processing described above, for example, method 200, may be executed by processing unit 401. For example, in some embodiments, method 200 may be implemented as a computer software program that is tangibly included in a machine-readable medium such as storage unit 408. In some embodiments, part of or all the computer program may be loaded and/or installed onto device 400 via ROM 402 and/or communication unit 409. When the computer program is loaded into RAM 403 and executed by CPU 401, one or more actions of method 200 described above may be implemented.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

The embodiments of the present disclosure have been described above. The above description is illustrative, rather than exhaustive, and is not limited to the disclosed various embodiments. Numerous modifications and alterations are apparent to those of ordinary skill in the art without departing from the scope and spirit of the illustrated embodiments. The selection of terms used herein is intended to best explain the principles and practical applications of the various embodiments or the improvements to technologies on the market, or to enable other persons of ordinary skill in the art to understand the embodiments disclosed here.

The invention claimed is:

1. A method for computer memory fault prediction, comprising:
   generating a plurality of memory fault predictions for a memory over a period of time using reliability indicators for the memory, each fault being predicted based on a comparison of a prediction confidence with a confidence threshold;
   determining an accuracy of the plurality of fault predictions over the period of time, the accuracy indicating an amount of work to reconstruct and diagnose predicted faulty memories after the fault prediction;
   adjusting the confidence threshold in response to the accuracy being less than an accuracy threshold;
   determining a detection rate of the fault prediction over the period of time;
   adjusting the confidence threshold reversely in response to the detection rate being less than a detection rate threshold; and
   migrating data out of the memory in response to the plurality of memory fault predictions for the memory.

2. The method according to claim 1, wherein determining the detection rate comprises:
   obtaining a first number of faulty memories determined by diagnosis over the period of time;
   obtaining a second number of faulty memories reported by processes other than the fault prediction over the period of time; and
   calculating the detection rate by dividing the first number by a sum of the first number and the second number.

3. The method according to claim 1, wherein a default value of the confidence threshold is 0.5.

4. The method according to claim 3, wherein the confidence threshold is not less than 0.5 and less than 1.

5. The method according to claim 1, further comprising determining the detection rate of the fault prediction over the period of time based on based on input/output errors discovered over the period of time.

6. The method according to claim 1, wherein the data is migrated out of the memory as part of a reconstruction of the memory.

7. The method according to claim 6, further comprising performing, after reconstruction of the memory, a read-write test on the memory to confirm whether the memory is faulty.

8. An electronic device for computer memory fault prediction, comprising:
   a processor; and
   a memory coupled to the processor, the memory having instructions stored therein, wherein the instructions, when executed by the processor, cause the device to perform actions comprising:
   generating a plurality of memory fault predictions for a memory over a period of time using reliability indicators for the memory, each fault being predicted based on a comparison of a prediction confidence with a confidence threshold;
   determining an accuracy of the plurality of fault predictions over the period of time, the accuracy indicating an amount of work to reconstruct and diagnose predicted faulty memories after the fault prediction;
   adjusting the confidence threshold in response to the accuracy being less than an accuracy threshold;
   determining a detection rate of the fault prediction over the period of time;
   adjusting the confidence threshold reversely in response to the detection rate being less than a detection rate threshold; and
   migrating data out of the memory in response to the plurality of memory fault predictions for the memory.

9. The device according to claim 8, wherein determining the detection rate comprises:
   obtaining a first number of faulty memories determined by diagnosis over the period of time;
   obtaining a second number of faulty memories reported by processes other than the fault prediction over the period of time; and
   calculating the detection rate by dividing the first number by a sum of the first number and the second number.

10. The device according to claim 8, wherein a default value of the confidence threshold is 0.5.

11. The device according to claim 10, wherein the confidence threshold is not less than 0.5 and less than 1.

12. The electronic device according to claim 8, wherein the instructions, when executed by the processor, cause the device to perform actions comprising determining the detection rate of the fault prediction over the period of time based on based on input/output errors discovered over the period of time.

13. The electronic device according to claim 8, wherein the data is migrated out of the memory as part of a reconstruction of the memory.

14. The electronic device according to claim 13, wherein the instructions, when executed by the processor, cause the device to perform actions comprising performing, after reconstruction of the memory, a read-write test on the memory to confirm whether the memory is faulty.

15. A computer program product tangibly stored on a non-transitory computer-readable storage medium and comprising machine-executable instructions, wherein the machine-executable instructions, when executed, cause a machine to perform operations of predicting computer memory faults, the operations comprising:
   generating a plurality of memory fault predictions for a memory over a period of time using reliability indicators for the memory, each fault being predicted based on a comparison of a prediction confidence with a confidence threshold;
   determining an accuracy of the plurality of fault predictions over the period of time, the accuracy indicating an amount of work to reconstruct and diagnose predicted faulty memories after the fault prediction;
   adjusting the confidence threshold in response to the accuracy being less than an accuracy threshold;
   determining a detection rate of the fault prediction over the period of time;
   adjusting the confidence threshold reversely in response to the detection rate being less than a detection rate threshold; and
   migrating data out of the memory in response to the plurality of memory fault predictions for the memory.

16. The computer program product according to claim 15, wherein determining the detection rate comprises:
   obtaining a first number of faulty memories determined by diagnosis over the period of time;
   obtaining a second number of faulty memories reported by processes other than the fault prediction over the period of time; and
   calculating the detection rate by dividing the first number by a sum of the first number and the second number.

17. The computer program product according to claim 15, wherein a default value of the confidence threshold is 0.5.

18. The computer program product according to claim 17, wherein the confidence threshold is not less than 0.5 and less than 1.

19. The computer program product according to claim 15, wherein the machine-executable instructions, when executed, cause the machine to perform operations further comprising determining the detection rate of the fault prediction over the period of time based on based on input/output errors discovered over the period of time.

20. The computer program product according to claim 15, wherein the data is migrated out of the memory as part of a reconstruction of the memory.

\* \* \* \* \*